US011093472B2

(12) United States Patent
Spillane et al.

(10) Patent No.: US 11,093,472 B2
(45) Date of Patent: Aug. 17, 2021

(54) USING AN LSM TREE FILE STRUCTURE FOR THE ON-DISK FORMAT OF AN OBJECT STORAGE PLATFORM

(71) Applicant: VMware, Inc., Palo Alto, CA (US)

(72) Inventors: Richard P. Spillane, Palo Alto, CA (US); Wenguang Wang, Santa Clara, CA (US); Junlong Gao, Mountain View, CA (US); Robert T. Johnson, Palo Alto, CA (US); Christos Karamanolis, Los Gatos, CA (US); Maxime Austruy, Lausanne (CH)

(73) Assignee: VMware, Inc., Palo Alto, CA (US)

( * ) Notice: Subject to any disclaimer, the term of this patent is extended or adjusted under 35 U.S.C. 154(b) by 294 days.

(21) Appl. No.: 16/213,714

(22) Filed: Dec. 7, 2018

(65) Prior Publication Data

US 2020/0183906 A1 Jun. 11, 2020

(51) Int. Cl.
*G06F 16/00* (2019.01)
*G06F 16/22* (2019.01)
*G06F 16/84* (2019.01)
*G06F 16/13* (2019.01)
*G06F 16/2455* (2019.01)

(52) U.S. Cl.
CPC .......... *G06F 16/2246* (2019.01); *G06F 16/13* (2019.01); *G06F 16/2219* (2019.01); *G06F 16/2272* (2019.01); *G06F 16/24552* (2019.01); *G06F 16/86* (2019.01)

(58) Field of Classification Search
None
See application file for complete search history.

(56) References Cited

U.S. PATENT DOCUMENTS

| 9,846,711 | B2* | 12/2017 | Borthakur | G06F 16/22 |
|---|---|---|---|---|
| 10,061,693 | B2* | 8/2018 | Kim | G06F 12/0246 |
| 10,691,693 | B2* | 6/2020 | Fanghaenel | G06F 16/172 |
| 10,740,300 | B1* | 8/2020 | Lakshman | G06F 11/1464 |
| 10,776,345 | B2* | 9/2020 | Rutherglen | G06F 16/2246 |
| 2020/0341889 | A1* | 10/2020 | Idreos | G06F 16/2246 |

OTHER PUBLICATIONS

Unknown, "Amazon Elastic File System (EFS)," Amazon Web Services, Inc., Accessed Dec. 17, 2018, https://aws.amazon.com/efs/, 21 pages.

(Continued)

*Primary Examiner* — Debbie M Le

(57) ABSTRACT

The disclosure herein describes providing and accessing data on an object storage platform using a log-structured merge (LSM) tree file system. The LSM tree file system on the object storage platform includes sorted data tables, each sorted data table including a payload portion and an index portion. Data is written to the LSM tree file system in at least one new sorted data table. Data is ready by identifying a data location of the data based on index portions of the sorted data tables and reading the data from a sorted data table associated with the identified data location. The use of the LSM tree file system on the object storage platform provides an efficient means for interacting with the data stored thereon.

20 Claims, 6 Drawing Sheets

(56) References Cited

OTHER PUBLICATIONS

Unknown, "What Is Amazon S3?," Amazon Web Services, Inc., Accessed Dec. 17, 2018, https://docs.aws.amazon.com/AmazonS3/latest/dev/Welcome.html, 1 page.
Unknown, "Request Rate and Performance Guidelines," Amazon Web Services, Inc., Accessed Dec. 17, 2018, https://docs.aws.amazon.com/AmazonS3/latest/dev/request-rate-perf-considerations.html, 1 page.
Unknown, "Amazon EC2," Amazon Web Services, Inc., Accessed Dec. 17, 2018, https://aws.amazon.com/ec2/?nc2=h_m1, 13 pages.
Unknown, "AWS Lambda," Amazon Web Services, Inc., Accessed Dec. 17, 2018, https://aws.amazon.com/lambda/?nc2=h_m1, 14 pages.
Unknown, "AWS Storage Gateway: File gateway for hybrid architectures overview and best practices," Amazon Web Services, Inc., Accessed Dec. 17, 2018, https://d1.awsstatic.com/whitepapers/aws-storage-gateway-tile-jateway-for-hybrid-architectures.pdf, 18 pages.
Unknown, "AWS Storage Gateway Faqs," Amazon Web Services, Inc., Accessed Dec. 17, 2018, https://aws.amazon.com/storagegateway/faqs/, 27 pages.
Bender, et al., "Cache-Oblivious Streaming B-Trees," In Proceedings of the Nineteenth Annual ACM Symposium on Parallel Algorithms and Architectures, SPAA '07, Jun. 9-11, 2007, 12 pages.
Brodal, et al., "Lower Bounds for External Memory Dictionaries," Alcom-FT Technical Report Series, ALCOMFT-TR-03-75, Accessed Dec. 17, 2018, http://tildeweb.au.dk/au121/papers/alcomft-tr-03-75.pdf, 13 pages.
Chang, et al., "Bigtable: A Distributed Storage System for Structured Data," Google, Inc., Accessed Dec. 18, 2018, https://static.googleusercontent.com/media/research.google.com/en//archive/bigtable-osdi06.pdf, 14 pages.
Unknown, "Welcome to RocksDB," GitHub, Inc., Sep. 7, 2017, https://github.com/facebook/rocksdb/wiki/Open-Projects, 6 pages.

Unknown, "Storage Engine," DataStax, Inc., Oct. 17, 2018, http://docs.datastax.com/en/cassandra/2.1/cassandra/dml/dml_manage_ondisk_c.html, 1 page.
Unknown, "Google Cloud Storage Documentation," Google, Inc., Accessed Dec. 18, 2018, https://cloud.google.com/storage/docs/#, 2 pages.
Unknown, "How Do I Ensure Data Integrity of Objects Uploaded to or Downloaded from Amazon S3?," Amazon Web Services, Inc., Accessed Dec. 18, 2018, https://aws.amazon.com/premiumsupport/knowledge-center/data-integrity-53/, 7 pages.
Unknown, "ObjectiveFS: A Shared Distributed Posix File System Backed by an Object Store," Amazon Web Services, Inc., Accessed Dec. 19, 2018, https://objectivefs.com, 7 pages.
O'Neil, et al., "The Log-Structured Merge-Tree (LSM-tree)," Accessed Dec. 19, 2018, https://www.cs.umb.edu/~poneil/lsmtree.pdf, 32 pages.
Palankar, et al., "Amazon s3 for Science Grids: A Viable Solution?," Accessed Dec. 21, 2018, http://citeseer.ist.psu.edu/viewdoc/download;jsessionid=20ECF0F566448EB9ACED424A739F8CF9?doi=10.1.1.112.9646&rep=rep1&type=pdf, 1 page.
Raju, et al., "PebblesDB: Building Key-Value Stores Using Fragmented Logstructured Merge Trees," Accessed, Dec. 21, 2018, www.cs.utexas.edu/~vijay/papers/sosp17-pebblesdb.pdf, 18 pages.
Unknown, "s3fs: Fuse-Based File System Backed by Amazon s3," GitHub, Accessed Dec. 19, 2018, https://github.com/s3fs-fuse/s3fs-fuse, 4 pages.
Unknown, "SQLite4 LSM Users Guide," SQLite, Accessed Dec. 19, 2018, https://sqlite.org/src4/doc/trunk/www/lsmusr.wiki, 18 pages.
Unknown, "YAS3FS: Yet Another s3-backed File System," GitHub, Accessed Dec. 21, 2018, https://github.com/danilop/yas3fs, 11 pages.
Kougkas, et al., "Enosis: Bridging the Semamtic Gap Betweem File-Based and Object-Based Data Models", The International Conference for High Performance Computing, Networking, Storage and Analysis, Workshop: The Eighth ntemational Workshop on Data-Intensive Computing in the Clouds, published 2017, 8 pages.

* cited by examiner

US 11,093,472 B2

USING AN LSM TREE FILE STRUCTURE FOR THE ON-DISK FORMAT OF AN OBJECT STORAGE PLATFORM

BACKGROUND

Using the services of data storage platform providers has become essential for many companies, organizations, and other types of enterprise customers to obtain a cost-effective storage solution for their data. This requires a relatively inexpensive, scalable storage backend with a large capacity for the archival data while still allowing retrieval of historical data within a reasonable amount of time and overwriting of existing data. Object storage platforms (e.g., Amazon S3, etc.) are a low-cost storage solution, but current object storage platforms have several drawbacks. For example, overwriting on an object storage platform may cause huge write amplification if the platform does not support overwrite. As such, changes in one byte of a file results in re-writing the entire file. As another example, if there are many relatively small files, each of the files ends up with a small object on the platform, resulting in many requests to transfer objects on the platform, which is expensive. It is inefficient to directly use the object storage platform for data operations that may change small portions of large files.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for accessing data on an object storage platform is described. A log-structured merge (LSM) tree file system on the object storage platform is accessed, the LSM tree file system including a plurality of sorted data tables, each sorted data table including a payload portion configured for storing sorted key-value data tuples and an index portion for storing keys of the key-value data tuples mapped to locations of associated key-value data tuples in the payload portion. Based on receiving a write data instruction associated with a first data set, the first data set is written to the LSM tree file system in at least one new sorted data table. Based on receiving a read data instruction associated with a second data set, a data location associated with the second data set is identified based on index portions of the plurality of sorted data tables and reading the second data set from a sorted data table associated with the identified data location.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for providing access to data on an object storage platform. The object storage platform has an LSM tree file system installed as an intermediate data layer to provide access to the data stored in the object storage platform. An exemplary LSM tree file system includes sorted data tables, and each sorted data table includes a payload portion configured for storing sorted key-value data tuples and an index portion for storing keys of the key-value data tuples mapped to locations of associated key-value data tuples in the payload portion. When a write data instruction is received, the data is written to the LSM tree file system in at least one new sorted data table. When a read data instruction is received, a data location associated with the data to be read is identified based on index portions of the sorted data tables and the data is read from a sorted data table associated with the identified data location.

The disclosure operates in an unconventional way at least by implementing the LSM tree file system on top of the object storage platform (e.g., Amazon S3, etc.) to take advantage of the inexpensive storage of the platform and reduce costs for data transfers and overwrites. The LSM tree file system provides features that synergize with the functionality of the object storage platform, such as immutable data writing, low write amplification, sequential scanning, and others. Additionally, the LSM tree file system layer enables rich features for data, such as compression, encryption, and checksum verification.

In some examples, the described system makes use of locally cached data table indexes as well as a catalog file that includes metadata for the data tables throughout the file system. The use of these locally cached metadata files enables much of the processing for data seeking in the file system to be done efficiently on the client side, rather than requiring additional (and potentially expensive) processing on the object storage platform server side. Clients are enabled to make data requests and provide precise location data (e.g., data table identifiers, offsets or addresses within the data tables, etc.), which is used on the server side to efficiently retrieve the requested data.

Clients are also configured to buffer or cache write data locally such that large sets of data are written to the LSM tree file system in batches, rather than many smaller data writes. Batching data writes in this way substantially reduces the potential write cost per data unit and, because data is only appended to the LSM tree file system (not overwritten) writing large batches of data at once is done efficiently.

Figure 1:
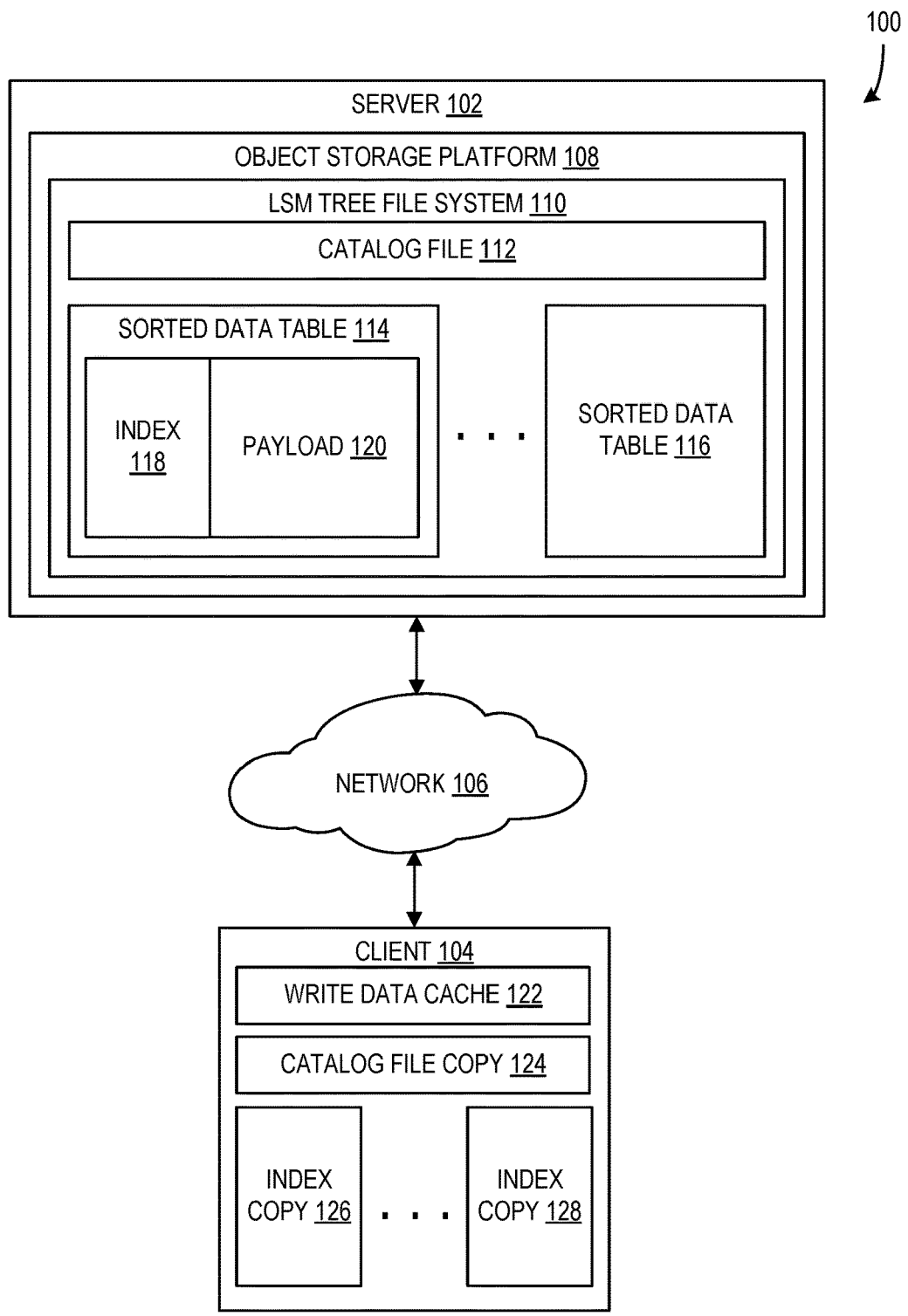
FIG. 1 is an exemplary block diagram illustrating a system configured for storing a providing access to data stored on an object storage platform according to an embodiment.

FIG. 1 is an exemplary block diagram illustrating a system 100 configured for storing and providing access to data (e.g., payload 120 data, etc.) on an object storage platform 108 according to an embodiment. The system 100 includes a server 102 and a client 104 that are in communication via a network 106. The server includes an object storage platform 108 upon which an LSM tree file system 110 is implemented. In some examples, the server 102 and client 104 are computing devices that include hardware, firmware, and/or software configured to perform the operations described herein as well as other general computing operations. Alternatively, or additionally, the system 100 may include multiple server devices configured as the server 102 and including the object storage platform 108, such that the described data storage is distributed across the multiple server devices. Further, the system 100 may include multiple client devices configured to access the object storage platform 108 as described herein without departing from the description.

The network 106 includes one or more computer networks that are configured to enable network communications between the server 102 and the client 104. It should be understood that communications between components of the system 100 may be performed using network connections on the network 106 as would be understood by a person of ordinary skill in the art of computer networks and communications. The network 106 may include a plurality of networks (e.g., private intranets, public networks such as the Internet, etc.) and/or network types (e.g., wired networks, wireless networks such as Wi-Fi networks or cellular networks, etc.). The network 106 may include any hardware, firmware, and/or software arranged in hierarchies or structures that enable the components of the system 100 to communicate as described without departing from the description herein.

The object storage platform 108 is configured to operate according to object storage principles as would be understood by a person of ordinary skill in the art. The object storage platform 108 may be configured to abstract the storage of the associated data to be exposed and/or managed as objects, which may include the data itself, associated metadata, and/or a unique identifier of the particular object. In some examples, the object storage platform 108 is configured such that overwriting existing data and/or performing many small data writes is relatively expensive (e.g., the platform 108 may not support overwriting, such that changes to one byte of a file may result in the rewriting of the entire file, many small files may be stored as individual objects, resulting in many separate requests for object transfers and other operations, etc.).

The LSM tree file system 110 is implemented on the object storage platform 108, effectively transforming the object storage interface of the platform 108 into a block device interface where block offset values are used as keys of key-value tuples and block content is used as the values of the tuples. The LSM tree file system 110 includes a catalog file 112 and a plurality of sorted data tables 114-116. It should be understood that, while only two sorted data tables are illustrated, the file system 110 may include more, fewer, or different sorted data tables without departing from the description herein. Each sorted data table 114-116 includes an index 118 and a payload 120. It should be understood that the LSM tree file system 110 is configured to adhere to known LSM tree principles unless otherwise specified herein (e.g., the LSM tree file system 110 is optimized for "immutable write", such that edited data is not overwritten, but rather, replacement data is appended to unused space in the file system, etc.). In some examples, the catalog file 112 includes up-to-date metadata associated with all sorted data tables 114-116 of the file system 110, such that the catalog file 112 serves as a superblock for the entire file system 110. Such metadata may include unique identifiers of the tables 114-116 and other metadata used to identify locations of data (e.g., identify the sorted data table within which a particular set of data is stored, etc.) within the file system 110 as described herein. The configuration of the catalog file 112 is described in greater detail below with respect to FIG. 2.

In some examples, the LSM tree file system 110 exposes application program interfaces (APIs) for use by other entities, such as the client 104. For instance, the file system 110 may expose a "lookup" API that enables the client 104 to request data based on a provided key value or other location data (e.g., table identifier, offset values, address values, etc.) and an "update" API that enables the client 104 to write or otherwise record data to the file system 110. Such APIs may be configured to perform a portion of or all of the operations as described herein with respect to interacting with the data stored in the file system 110.

It should be understood that, while use of an LSM tree file system is primarily described, in other examples, other types of write optimized tree structures and/or techniques may be used (e.g., cache oblivious look-ahead arrays (COLA), BE-trees, fractal cascade trees, copy on write, etc.).

Further, in some examples, the object storage platform 108 and associated LSM tree file system 110 are configured to be used as a virtual disk by virtual machines or other software entities on the client 104 or other software entities associated with other devices.

Each of the sorted data tables 114-116 (e.g., Sorted String Tables, etc.) store data in the payload 120 and index 118 is configured to provide information about the specific locations of data in the payload 120. In some examples, the LSM tree file system 110 provides access to data in the form of data blocks of uniform size that are indexed by an offset location or address of each data block in the file system (e.g., each data block may be 4 KB in size and indexed by a numeric value that indicates a number of blocks that the data block is offset from the beginning of the file system, etc.). In such a configuration, the index 118 may contain keys that indicate an offset location of the associated data block within the file system and values mapped to the keys that indicate an offset location of the data block within the specific payload 120. Further, in some examples, catalog file 112 and the index 118 and payload 120 of each sorted data table 114-116 may be stored as separate objects with respect to the object storage platform 108. The structure of the sorted data tables 114-116 are described in greater detail below with respect to FIG. 2.

It should be understood that, in some examples, the file system 110 may be configured to include bloom filters that enable the efficient determination of whether a particular data tuple is present in a given sorted data table. However, because the file system 110 includes a catalog file 112 and an index 118 for each sorted data table 114-116, the metadata contained therein may be used to identify the location of a particular data tuple as described herein without using a bloom filter in other examples.

The client 104 includes a write data cache 122, a catalog file copy 124, and a plurality of index copies 126-128. The write data cache 122 may be installed or otherwise stored on the client 104. The client 104 is configured to use the write data cache 122 when writing data to the file system 110 and the catalog file copy 124 and index copies 126-128 when reading data from the file system 110. In some examples, the client 104 is configured to write data to the write data cache 122 that is intended to be written to the LSM tree file system 110. The client 104 may be configured to only write data values that are new or are being changed to the write data cache 122 rather than, for instance, entire files that are largely the same but include some data values being changed. The write data cache 122 may have an associated capacity threshold and/or an expiration time interval. The client 104 may be configured to send the data in the write data cache 122 when the quantity of data in the cache 122 meets or exceeds the capacity threshold. Additionally, or alternatively, the client 104 may be configured to send the data in the write data cache 122 when the time passed since the last write to the server 102 meets or exceeds the expiration time interval of the cache 122. The capacity threshold and/or expiration time interval may be defined as default values or otherwise set by users of the system 100.

In some examples, the client 104 is configured to use the locally cached catalog file copy 124 and index copies 126-128 to identify locations of data to be read from the file system 110 prior to accessing the server 102. For instance, to read a set of data from a particular location address in the file system 110, the client 104 may search the catalog file copy 124 to identify the sorted data table or tables on which the desired set of data is stored and then search the index copies 126-128 associated with the identified sorted data table or tables for offset locations of the set of data within the identified tables. The client 104 may then use the identified tables and associated offset locations to request the desired set of data from the file system 110 on the server 102. Such use of the catalog file copy 124 and/or index copies 126-128 may reduce the relative resource costs associated with performing the search operations and read operations in the file system 110 on the server 102.

Further, the client 104 may be configured to maintain up-to-date versions of the catalog file copy 124 and index copies 126-128 by retrieving or otherwise receiving catalog file data and index data from the server 102 on a periodic basis and/or when triggered by occurrence of defined events. In some examples, the client 104 may retrieve or otherwise receive updated versions of the catalog file 112 from the server 102 and, based on the metadata structure defined by the most recently received catalog file version, generate up-to-date index copies 126-128. However, other methods for maintaining up-to-date versions of the catalog file 112 are operable with the present disclosure.

In some examples, the system may be configured to provide additional features, such as compression, checksum verification, encryption, or the like. For instance, the client 104 may be configured to compress data in a manner understood by a person of ordinary skill in the art prior to sending it to be written in the LSM tree file system 110. Such compression may require that the associated indexes (e.g., index 118, etc.) be configured to account for the compressed size.

Alternatively, or additionally, the LSM tree file system 110 may be configured to include checksums for the data being stored in the sorted data tables 114-116. Such checksums may be generated per block or based on another data unit size and the checksums may be stored in the index 118 of the associated sorted data table 114. Later, when data is ready by the client 104, the checksum in the index 118 may be verified according to methods understood by a person of ordinary skill in the art.

In further examples, the system 100 may be configured to provide encryption of data being stored on the LSM tree file system 110. For instance, the client 104 may be configured to encrypt data according to any known technique prior to writing the data to the LSM tree file system 110 and to decrypt the data according to the associated decryption technique after it is retrieved from the LSM tree file system 110. Because the file system 110 and object storage platform 108 are largely agnostic regarding the arrangement of the data therein, so long as the client 104 is configured to perform the encryption and decryption operations, the server-side operations may be performed in the same manner as described herein.

Further details regarding operations for reading data from and writing data to the file system 110 from the client 104 are provided below with respect to FIGS. 3, 4, and 5.

Figure 2:
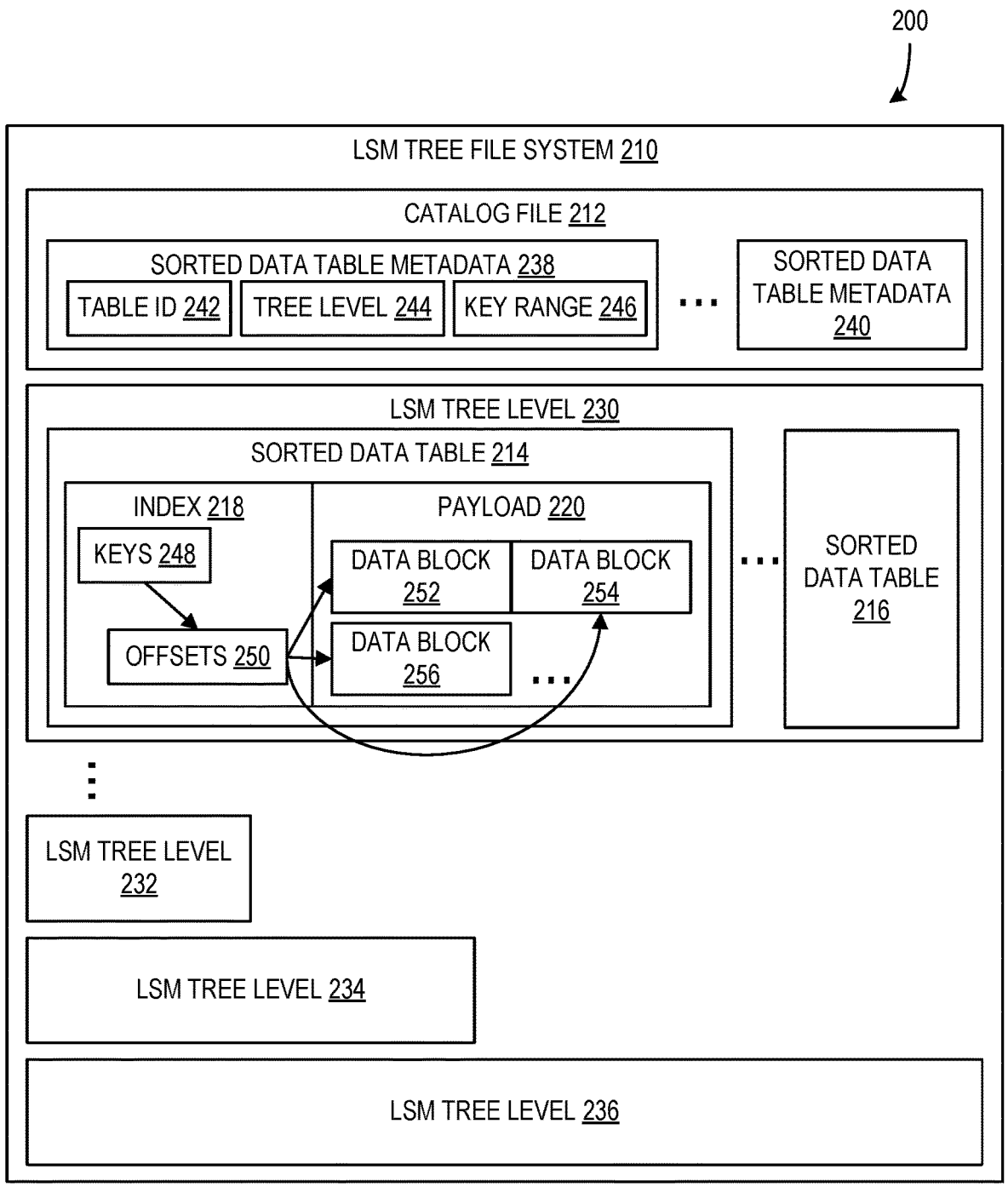
FIG. 2 is an exemplary block diagram illustrating a configuration of an LSM tree file system for use on an object storage platform according to an embodiment.

FIG. 2 is an exemplary block diagram illustrating a configuration of an LSM tree file system 210 for use on an object storage platform (e.g., object storage platform 108, etc.) according to an embodiment. The LSM tree file system 210 includes a catalog file 212 and a plurality of sorted data tables 214-216 as described herein. The plurality of sorted data tables 214-216 are organized in a plurality of LSM tree levels 230-236 according to known LSM tree characteristics.

The catalog file 212 includes sorted data table metadata 238-240 associated with each of the sorted data tables 214-216. Each sorted data table metadata 238-240 includes at least a table ID 242, a tree level 244, and a key range 246. The table ID 242 is a unique identifier within file system 210 for the associated sorted data table 214. It may be in the form of a code, a name, or any other practical form of identifier without departing from the description. The tree level 244 is a value that indicates the level (e.g., LSM tree levels 230, 232, 234, or 236, etc.) on which the associated sorted data table is currently located. The LSM tree levels 230-236 are described in greater detail below, but it should be understood that the tree levels 230-236 are generally configured as levels or rows of data according known LSM tree principles as would be understood by a person of ordinary skill in the art. The key range 246 of a sorted data table indicates a range of keys (e.g., offsets or addresses of the file system, etc.) for which data is stored in the associated sorted data table. For instance, if a sorted data table includes data with keys from offset 100 to offset 150 in the file system, the key range 246 of the sorted data table may be configured to indicate the range from 100-150. Key ranges 246 may include a first key and a total number of keys or an endpoint key to express a continuous key range. Alternatively, or additionally, if a sorted data table includes multiple ranges of contiguous keys, the key range 246 may be configured to include each range (e.g., 100-150; 225-260; 300-380, etc.). In some examples, the catalog file 212 may be in the form of, for instance, a JavaScript Object Notation (JSON) file including the described metadata values.

The LSM tree file system 210 is configured to arrange sorted data tables 214-216 in one or more LSM tree levels 230-236. It should be understood that, while sorted data tables 214-216 are illustrated as part of the LSM tree level 230, all the tree levels 230-236 may include one or more sorted data tables 214-216 without departing from the description herein. Further, it should be understood that the file system 210 may include more, fewer, or different tree levels than those illustrated without departing from the description herein.

The LSM tree levels 230-236 are interrelated according to a hierarchy according to LSM tree principles. In some examples, the tree level 230 is the "top" level. All data written to the file system 210 is initially written to one or more sorted data tables 214 in the top level 230. The lower levels 232-236 are created and/or populated with sorted data tables 214-216 when data from the top level and other relatively "higher" levels undergo a "compaction" process, which is known in the art with respect to LSM trees. Compaction may be performed when a tree level reaches a defined capacity threshold of sorted data tables and/or based on a defined time interval expiring. In some examples, compaction results in one or more sorted data tables 214-216 on the top level 230 being combined or merged into a single sorted data table and appended to the next level (e.g., LSM tree level 232, etc.) of the LSM tree file system 210.

Further, while the top level 230 may include sorted data tables with overlapping key ranges, the compaction process results in such overlapping sorted data tables being merged, such that none of the other levels of the LSM tree file system 210 includes sorted data tables with overlapping key ranges. Further, the sorted data tables 214-216 in levels of the file system below the top level may be arranged in key order.

Additionally, each tree level of the LSM tree file system 210 may be configured to be exponentially or otherwise substantially larger than the tree level immediately above it (e.g., as illustrated by the variable width of LSM tree levels 232, 234, and 236, etc.). Due to this substantial increase in capacity from higher level to lower level, large quantities of data may be stored and managed in the LSM tree file system 210 using relatively few total tree levels. It should be understood that this aspect of the LSM tree file system 210 is generally based on known LSM tree principles and the capacity sizes of the various tree levels 230-236 may be set to any values in accordance with known LSM tree principles without departing from the description.

Each sorted data table 214-216 includes an index 218 and a payload 220 as described herein. Each index 218 includes keys 248 mapped to offsets 250 of data blocks 252-256 in the associated payload. Thus, there is a key 248 in the index 218 associated with each data block 252-256 in the payload 220 of a sorted data table 214. In some examples, the data blocks 252-256 are sorted in key order (e.g., lowest associated key 248 to highest associated key 248, etc.). The offset 250 for each key 248 indicates the offset location of the associated data block 252-256 within the payload 220. For instance, in a system where keys 248 are block offsets or addresses within the greater file system 210, a data block 252 associated with a key 248 of 2000 (e.g., the 2000$^{th}$ data block of the greater file system 210, etc.) may have an offset 250 of zero if it is the first data block in the payload 220 of the associated sorted data table 214. Thus, to access the data at offset 2000 of the file system 210, the key 248 that includes the value "2000" is found in the index 218, the mapped offset 250 of "0" is then identified, and that offset 250 is used to find the location of the data block 252 in the payload 220.

In some examples, data blocks 252-256 may be configured to include associated keys 248 as well as payload data. For instance, a data block's key 248 may be located in the first data location of the data block based on the associated offset 250.

Figure 3:
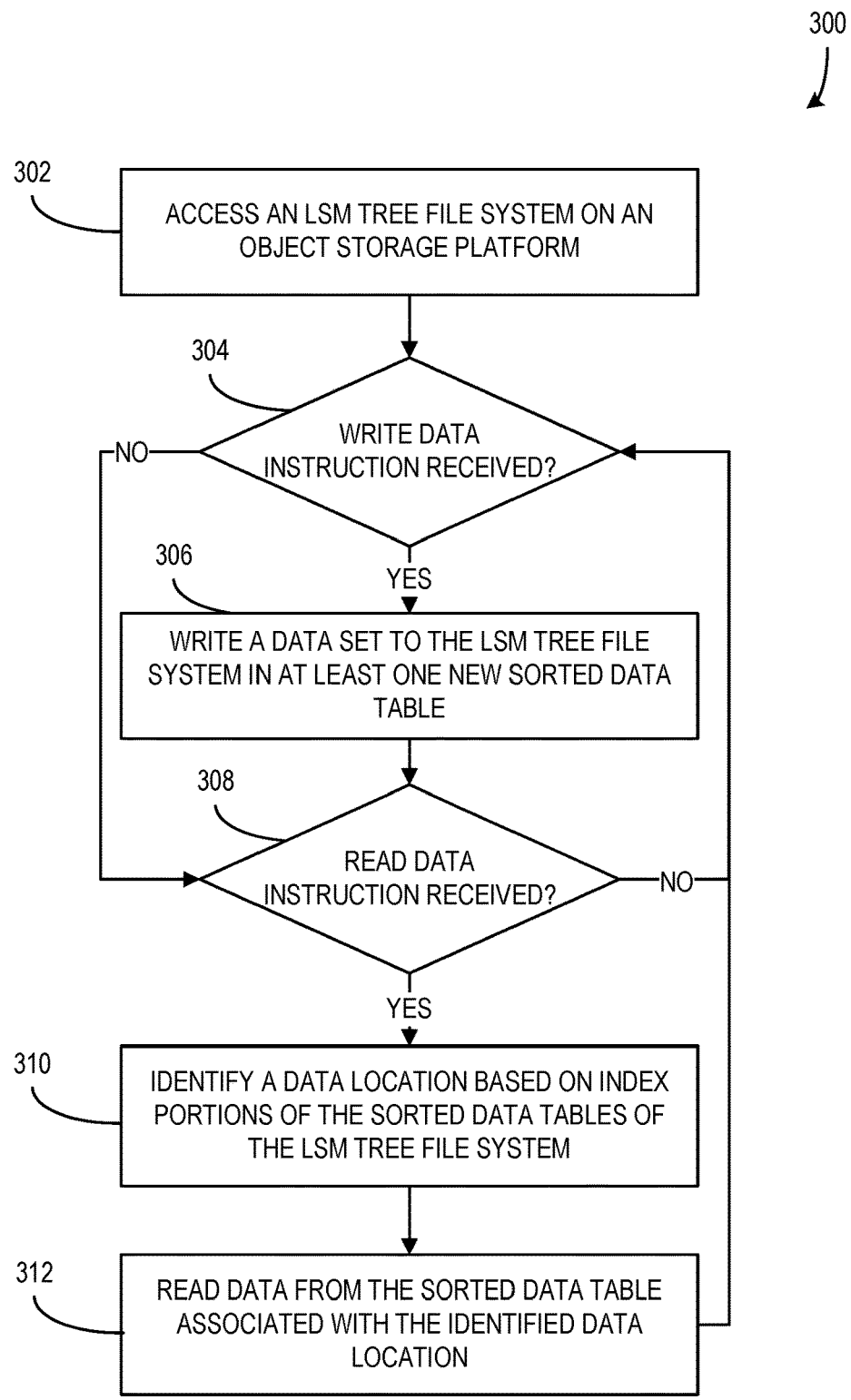
FIG. 3 is an exemplary flow chart illustrating a method of providing access to data on an object storage platform according to an embodiment.

FIG. 3 is an exemplary flow chart 300 illustrating a method of providing access to data on an object storage platform (e.g., object storage platform 108, etc.) according to an embodiment. In some examples, the method described in FIG. 3 may be implemented by a component or components of a system, such as system 100 of FIG. 1. At 302, an LSM tree file system is accessed on an object storage platform. The LSM tree file system may be installed on or otherwise stored on the object storage platform as described above with respect to FIGS. 1 and 2. In some examples, accessing the LSM tree file system may be performed by a component or components of the device upon which the object storage platform is installed (e.g., the server 102, etc.). Alternatively, or additionally, accessing the LSM tree file system may be performed by a separate device and/or components thereof (e.g., the client 104, etc.) as described herein. It should be understood that accessing the LSM tree file system may further include accessing a plurality of sorted data tables and each sorted data table may include a payload portion configured for storing sorted key-value data tuples and an index portion for storing keys of the key-value data tuples mapped to locations of associated key-value data tuples in the payload portion, as described herein.

At 304, if a write data instruction is received, the method proceeds to 306. Alternatively, if no write data instruction is received, the method proceeds to 308. The write instruction received at 304 may be from an application of an associated device and/or based on user input received by the associated device. For instance, use of the client 104 in system 100 results in write instructions associated with writing data to the LSM tree file system 110 on the server 102 being received.

Based on receiving a write instruction at 304, a data set associated with the received write instruction is written to the LSM tree file system in at least one new sorted data table at 306. In some examples, the data set being written is written to a plurality of new sorted data tables according to the processes described herein and/or according to known LSM tree principles. Further, the data set being written may be written from a write data cache (e.g., write data cache 122 of client 104, etc.), in which the data set had previously been stored for a period of time. It should be understood that writing data to the LSM tree file system includes writing data to the associated object storage platform, and writing the data to new sorted data tables or the like may result in the creation of new objects within the object storage platform (e.g., each index portion and payload portion of a sorted data table may be written to separate objects, etc.) and/or otherwise interacting with objects of the object storage platform.

Additionally, in some examples, writing the data set to the LSM tree file system may include execution of a staging process to avoid interrupting current I/O operations when a data set is written to the LSM tree file system. The staging process may include cloning a second instance of the current write data cache or other similar data cache, such that one instance is used as the live data cache for receiving new I/O instructions and/or messages and the second instance is used as a stable cache to be written to the LSM tree file system. However, other staging methods are operable with the present disclosure.

At 308, if a read data instruction is received, the process proceeds to 310. Alternatively, if no read data instruction is received, the process returns to 304. As with the write instruction, the read instruction received at 308 may be from an application of an associated device and/or based on user input received by the associated device. Further, it should be understood that, while the flow chart 300 illustrates operations associated with a received write instruction before steps associated with a received read instruction, the receiving of write instructions and/or read instructions may be independent processes, such that they may occur in any order or sequence, based on the operations of associated devices and/or components thereof.

At 310, based on receiving a read data instruction, a data location or locations of data associated with the read data instruction are identified based on index portions of the sorted data tables of the LSM tree file system. As described herein, in some examples, the index portions include mappings from keys, of key-value data tuples stored in the sorted data tables, to locations (e.g., offset values, size of data (useful since data may be compressed), addresses, etc.) of the associated key-value data tuples within the sorted data tables. Identifying a data location based on a read data instruction may include using a key provided in the read data instruction, identifying a sorted data table that includes data associated with the key, and searching for the key in the index portion of the sorted data table. Then, the data location is identified based on the location to which the key is mapped in the index portion.

In some examples, identifying the data location of the data associated with the read data instruction includes accessing a catalog file (e.g., catalog file 112, 212, etc.) that includes metadata of the sorted data tables of the LSM tree file system. The catalog file may be used to determine the sorted data table that includes the key or keys provided in the read data instruction based on key range metadata associated with identifiers of the sorted data tables in the catalog file.

Further, identifying the data location may be based on searching local copies of index portions of the sorted data tables and/or associated catalog files as described herein with respect to, for instance, client 104 and the associated catalog file copy 124 and index copies 126-128.

At 312, the data associated with the read data instruction is read from the sorted data table associated with the identified data location of the LSM tree file system. It should be understood that, in some examples, the read data instruction may be associated with data in multiple sorted data tables and the described method may include identifying data locations in each sorted data table and then reading the data from each sorted data table as described herein. Reading the data may include requesting the data from the LSM tree file system via a network connection (e.g., client 104 requesting data from server 102 via network 106, etc.).

Figure 4:
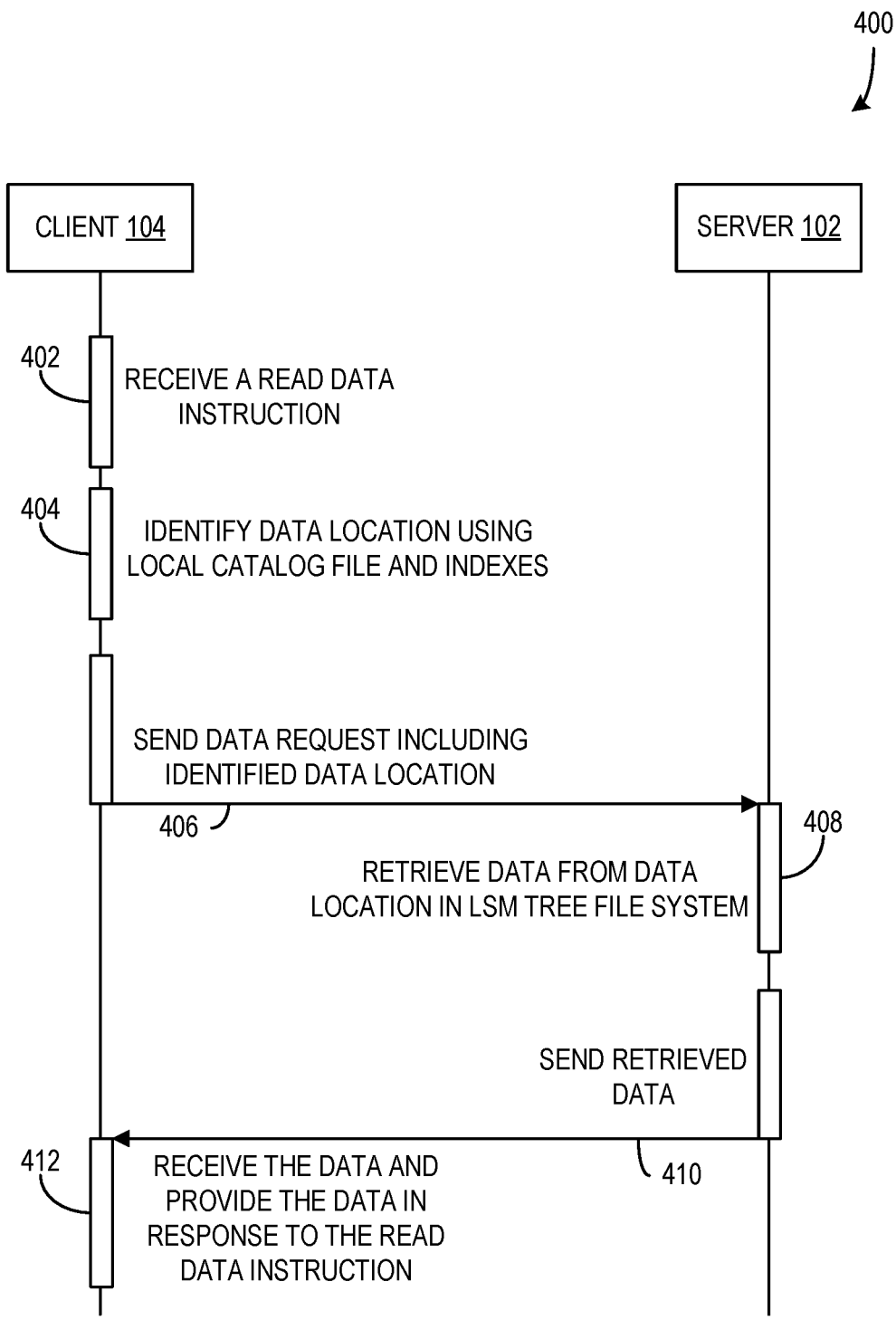
FIG. 4 is an exemplary sequence diagram illustrating a method of reading data from an LSM tree file system on an object storage platform according to an embodiment.

FIG. 4 is an exemplary sequence diagram 400 illustrating a method of reading data from an LSM tree file system (e.g. LSM tree file system 110, etc.) on an object storage platform (e.g., object storage platform 108, etc.) according to an embodiment. At 402, the client 104 receives a read data instruction. As described above, the client 104 may receive read data instructions based on operations of software or other components therein, based on provided user input, and/or based on communication over network connections with other entities.

At 404, the client 104 identifies a data location using a local catalog file and indexes (e.g., catalog file copy 124 and index copies 126-128, etc.). As described above, identifying the data location may include identifying a sorted data table based on key range metadata in the local catalog file and identifying the data location in the identified sorted data table based on the local index of that sorted data table.

At 406, the client 104 sends a data request to the server 102 including the identified data location. The data request may further include, for instance, identifiers of one or more sorted data tables associated with the data location of the data being requested. Additionally, the data request may include an LSM tree level of the file system associated with the data location. The data request may be sent over a network connection (e.g., via network 106, etc.). In some examples, the data request may include multiple data locations associated with multiple data requests being requested.

At 408, the server 102 receives the data request and retrieves the requested data from the data location in the LSM tree file system. The data retrieval may include seeking in the LSM tree file system to the included data location. Seeking to the data location may include identifying an LSM tree level, a sorted data table, and/or an offset or address within the sorted data table at which the data to be retrieved is located.

At 410, the server 102 sends the retrieved data back to the client 104. As described above, sending the retrieved data may include sending the data over a network connection (e.g., via network 106, etc.). At 412, the client 104 receives the data from the server 102 and provides the data in response to the read data instruction.

Figure 5:
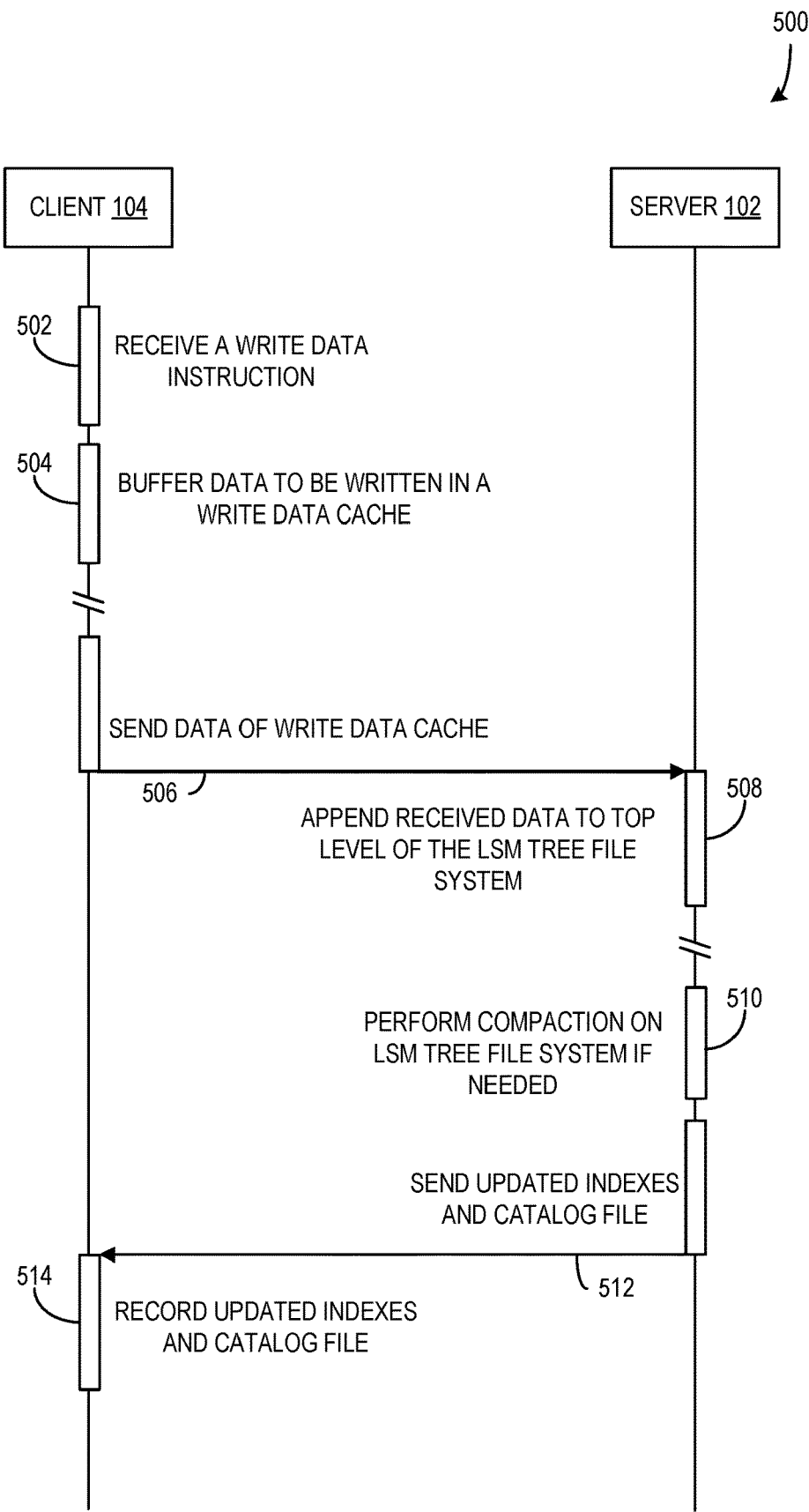
FIG. 5 is an exemplary sequence diagram illustrating a method of writing data to an LSM tree file system on an object storage platform according to an embodiment.

FIG. 5 is an exemplary sequence diagram 500 illustrating a method of writing data to an LSM tree file system (e.g. LSM tree file system 110, etc.) on an object storage platform (e.g., object storage platform 108, etc.) according to an embodiment. At 502, the client 104 receives a write data instruction. As described above, the client 104 may receive read data instructions based on operations of software or other components therein, based on provided user input, and/or based on communication over network connections with other entities.

At 504, the data to be written is buffered in a write data cache (e.g., write data cache 122, etc.). Data writes may be stored or cached locally in this way to avoid performing many relatively small write operations in the LSM tree file structure and, instead, perform fewer and/or larger write operations as data to be written builds up in the write data cache. The data may remain in the write data cache until the amount of data in the write data cache meets or exceeds a capacity threshold and/or until a cache time interval expires. For instance, if the capacity threshold of the write data cache is 10 MB and the cache time interval is 10 minutes, a 3 MB file written to the write data cache may remain in the cache until more files or data are added to the cache to meet or exceed 10 MB or until 10 minutes after the 3 MB file (or other data written to the cache earlier) was written to the write data cache. It should be understood that, in other examples, more, fewer, or different thresholds or conditions may be applied to the write data cache to determine when the data in the cache is written to the LSM tree file structure.

At 506, the client 104 sends the data in the write data cache to the server 102 to be written to the LSM tree file structure and the associated object storage platform. In some examples, the data of the write data cache may be converted or otherwise transformed into one or more sorted data tables for inclusion in the LSM tree file structure. As described herein, sending the data in the write data cache may include sending the data over a network connection (e.g., via network 106, etc.).

At 508, the server 102 receives the data to be written from the client 104 and appends the data to the top level (e.g., tree level 230, etc.) of the LSM tree file system. Based on known LSM tree principles, data written to the LSM tree file system is written as new data in one or more sorted data tables in the top row of the file system. The written data may remain on the top level for a period of time that depends on the total capacity of the top level and/or how much other data is being written to the LSM tree file system.

At 510, the server 102 may perform a compaction of the LSM tree file system if needed (e.g., when indicated based on the "shape" of the LSM tree). It should be understood that the compaction may be performed according to known LSM tree principles as would be understood by a person of ordinary skill in the art. The compaction process may result in some or all sorted data tables of a particular tree level being combined into one or more sorted data tables on a tree level immediately below the particular tree level. Compaction may occur when the amount or data in the particular row meets or exceeds a capacity threshold of that level (e.g., the LSM tree is "out of shape", etc.). In some examples, the top level to which the received data is appended has the smallest capacity threshold, such that compaction from the top level to the second highest level may happen relatively frequently. Compaction may further enable improved ordering of the data that is moved down a row and provides the ability to combine sorted data tables with overlapping key ranges, eliminating some redundant data storage.

After compaction is performed, the index portions of the sorted data tables and the associated catalog file may need to be updated to new versions that reflect the changes to the structure of the LSM tree file system. At 512, the server 102 sends such updated indexes and an updated catalog file to the client 104, enabling the client 104 to perform read data operations as described above with respect to FIG. 4 using up-to-date local copies of the metadata of the LSM tree file system. The sending of these updated indexes and catalog file may be based on the compaction occurring, based on the client 104 requesting them, or based on another trigger event.

At 514, the client 104 records the updated index copies and catalog file copy received from the server 102. The client 104 is enabled to use the up-to-date metadata to perform data read operations.

Additional Example Scenarios

Aspects of the disclosure enable various additional scenarios, such as next described.

In an example, an LSM tree file system is installed on an object storage platform as described herein. The object storage platform is installed on a server which is connected via a network to multiple clients. One of the clients receives instructions to write a new file to the LSM tree file system on the server. The client places the new file in a write data cache local to the client. Later, the client receives several more instructions to write new files to the file system on the server. All of the new files are added to the write data cache on the client. The combination of all the new files to be written exceeds a capacity threshold of the write data cache, triggering the client to send the contents of the write data cache to the server to be written to the LSM tree file system.

The server receives the new files from the client and proceeds to write them to the LSM tree file system. The new files are appended to the top level of the file system as a plurality of new sorted data tables. In addition to writing the new files, an index portion of each new sorted data table is also written to the file system.

With the addition of the new files to the top level of the LSM tree file system, a capacity threshold of the top level is exceeded and a compaction is triggered. The server combines the data of the plurality of sorted data tables in the top level with the sorted data tables in the level immediately below the top level (e.g., the second level, etc.) to form a new second level that includes sorted data tables ordered by key ranges. The compaction ensures that none of the sorted data tables have overlapping key ranges. Once the data of the top level of the LSM tree file system is compacted with the second level, the top level may be considered clear to receive more data.

In a further example, a client receives an instruction to read the data of a file that is stored in the LSM tree file system of the server. The client has copies of the indexes of the sorted data tables of the LSM tree file system stored, as well as a copy of a catalog file that includes metadata associated with the sorted data tables. The read instruction includes block identifiers associated with the file to be read. The client compares the block identifiers to the key ranges of the sorted data tables that are stored in the catalog file copy. Upon identifying a set of sorted data tables that include the block identifiers of the file to be read, the client accesses the index copies of those sorted data tables to determine offset addresses of the data of the files. The client then sends a data request to the server that includes the identifiers of the identified sorted data tables and the offset addresses of the requested data within those sorted data tables. The server retrieves the data based on the provided location data values and returns it to the client as requested.

Exemplary Operating Environment

Figure 6:
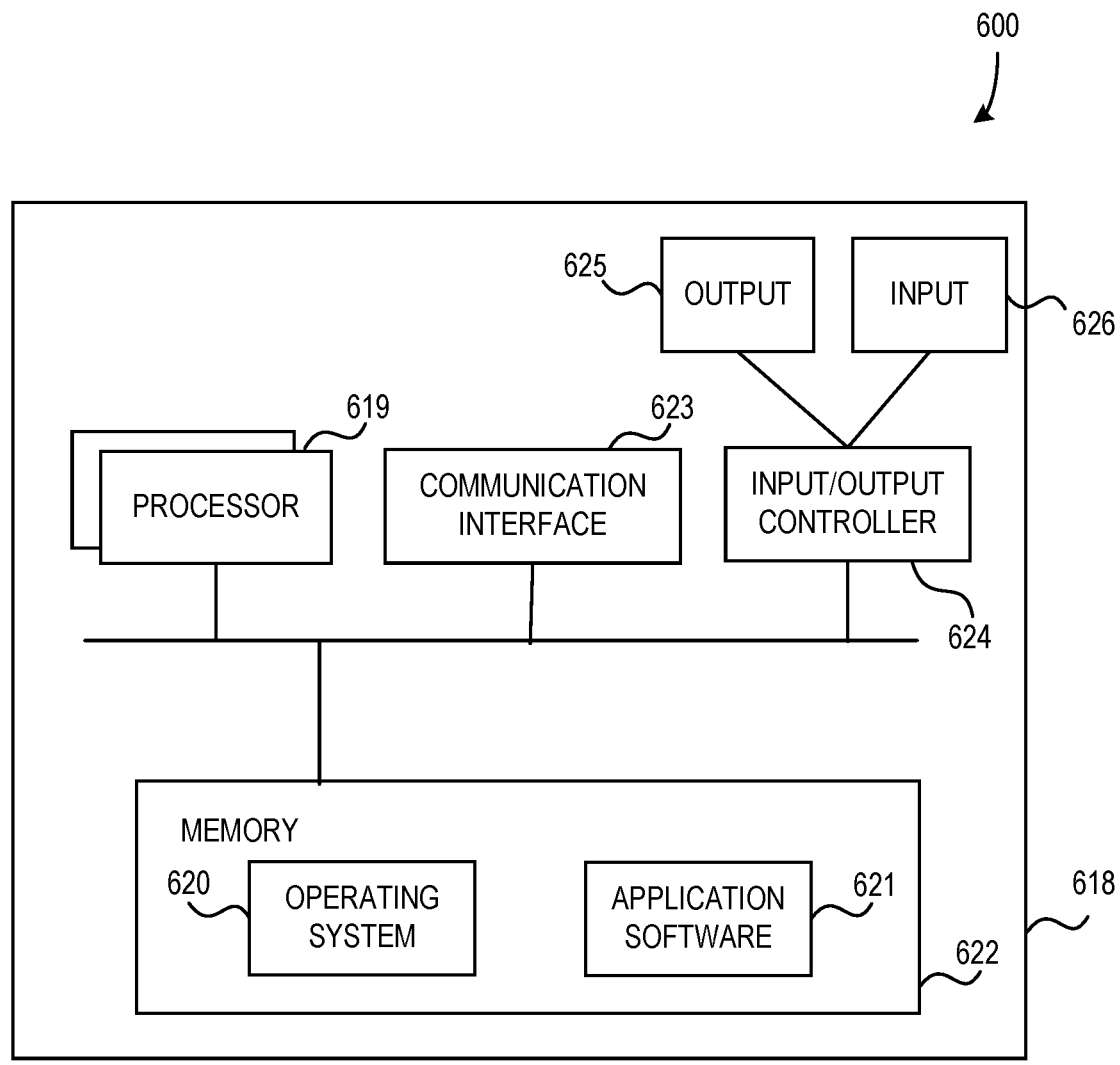
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, installing or otherwise integrating an LSM tree file system on an object storage platform as described herein may be accomplished by software, hardware, or both.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for storing data on an object storage platform comprises: the object storage platform; a file system installed on the object storage platform, the file system configured as a LSM tree data structure; wherein the LSM tree data structure includes a plurality of sorted data tables, each sorted data table including a payload portion configured for storing sorted key-value data tuples and an index portion for storing keys of the key-value data tuples mapped to offset locations of associated key-value data tuples in the payload portion.

An example method for accessing data on an object storage platform comprises: accessing, by a processor, a LSM tree file system on the object storage platform, the LSM tree file system including a plurality of sorted data tables, each sorted data table including a payload portion configured for storing sorted key-value data tuples and an index portion for storing keys of the key-value data tuples mapped to locations of associated key-value data tuples in the payload portion; based on receiving a write data instruction associated with a first data set, writing, by the processor, the first data set to the LSM tree file system in at least one new sorted data table; and based on receiving a read data instruction associated with a second data set, identifying, by the processor, a data location associated with the second data set based on index portions of the plurality of sorted data tables and reading the second data set from a sorted data table associated with the identified data location.

A non-transitory computer readable storage medium having stored thereon program code executable by a first computer system at a first site, the program code embodying a method for accessing data on an object storage platform, the method comprising: accessing a LSM tree file system on the object storage platform, the LSM tree file system including a plurality of sorted data tables, each sorted data table including a payload portion configured for storing sorted key-value data tuples and an index portion for storing keys of the key-value data tuples mapped to locations of associated key-value data tuples in the payload portion; based on receiving a write data instruction associated with a first data set, writing the first data set to the LSM tree file system in at least one new sorted data table; and based on receiving a read data instruction associated with a second data set, identifying a data location associated with the second data set based on index portions of the plurality of sorted data tables and reading the second data set from a sorted data table associated with the identified data location.

Alternatively, or in addition to the other examples described herein, examples include any combination of the following:

wherein, for each sorted data table, the index portion is stored as a first object of the object storage platform and the payload portion is stored as a second object of the object storage platform.

wherein the LSM tree data structure further includes a catalog file configured for storing table identifiers mapped to key ranges of the plurality of sorted data tables.

wherein the object storage platform is installed on at least one server device connected to a network;
at least one client device is connected to the network; wherein the client device is configured to at least one of read data from and write data to the object storage platform using the file system via the network.
wherein at least one client device is configured to locally store index portion copies of the index portions of the plurality of sorted data tables and a catalog file copy of the catalog file.
wherein reading data, by at least one client device, from the object storage platform using the file system includes: identifying a data location associated with the data to be read in the file system based on the locally stored index portion copies and catalog file copy; and requesting the data to be read from the server device via the network based on the identified data location.
wherein writing data, by at least one client device, to the object storage platform using the file system includes: buffering data to be written in a write data cache; and based on at least one of a cache capacity threshold being exceeded and a cache time interval expiring, sending the data in the write data cache to the server device via the network.
wherein the server device is configured to: based on receiving data to be written to the object storage platform, appending the received data as at least one sorted data table to a top row of the LSM tree structure of the file system.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for accessing an LSM tree file system on the object storage platform, the LSM tree file system including a plurality of sorted data tables, each sorted data table including a payload portion configured for storing sorted key-value data tuples and an index portion for storing keys of the key-value data tuples mapped to locations of associated key-value data tuples in the payload portion; based on receiving a write data instruction associated with a first data set, exemplary means for writing the first data set to the LSM tree file system in at least one new sorted data table; and based on receiving a read data instruction associated with a second data set, exemplary means for identifying a data location associated with the second data set based on index portions of the plurality of sorted data tables and reading the second data set from a sorted data table associated with the identified data location. The illustrated one or more processors 619 together with the computer program code stored in memory 622 constitute exemplary processing means for accessing the LSM tree file system on an object storage platform, maintaining the LSM tree file system, and performing data operations thereon as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for accessing data on an object storage platform, the method comprising:
    accessing, by a processor, a log-structure merge (LSM) tree file system on the object storage platform, the LSM tree file system including a plurality of sorted data tables, each sorted data table including a payload portion configured for storing sorted key-value data tuples and an index portion for storing keys of the key-value data tuples mapped to locations of associated key-value data tuples in the payload portion, the LSM tree file system further including a catalog file configured for storing table identifiers mapped to key ranges of the plurality of sorted data tables;

based on receiving a write instruction associated with a first data set, writing, by the processor, the first data set to the LSM tree file system in at least one new sorted data table and updating the catalog file to include a table identifier of the at least one new sorted data table mapped to a key range of the at least one new sorted data table; and based on receiving a read data instruction associated with a second data set, identifying, by the processor, a data location associated with the second data set based on a table identifier mapped to key ranges of the second data set in the catalog file and on index portions of the sorted data table with which the table identifier is associated and reading the second data set from a sorted data table associated with the identified data location.

2. The computerized method of claim 1, wherein, for each sorted data table, the index portion is stored on a first object of the object storage platform and the payload portion is stored as a second object of the object storage platform.

3. The computerized method of claim 1, wherein the object storage platform is installed on at least one server device connected to a network;
the processor is installed on a client device connected to the network; and
wherein the client device is configured to at least one of read data from and write data to the object storage platform using the LSM tree file system via the network.

4. The computerized method of claim 3, further comprising:
storing, by the processor, index portion copies of the index portions of the plurality of sorted data tables and a catalog file copy of the catalog file on the client device.

5. The computerized method of claim 4, wherein identifying the data location includes identifying the data location associated with the second data set based on the stored index portion copies and the catalog file copy; and
wherein reading the second data set includes requesting the second data set from the server device via the network based on the identified data location.

6. The computerized method of claim 3, wherein writing the first data set to the LSM tree file system includes:
buffering the first data set in a write data cache on the client device; and
based on at least one of a cached capacity threshold being exceeded and a cache time interval expiring, sending the data in the write data cache to the server device via the network.

7. The computerized method of claim 4, wherein the LSM tree file system is compacted on the server device based on writing the first data set to the LSM tree file system; and
wherein the computerized method further comprises:
receiving, by the processor from the server device, an updated catalog file copy and updated index portion copies of the LSM tree file system, wherein the updated catalog file copy and updated index portion copies are configured to reflect a structure of the LSM tree file system after being compacted; and
storing, by the processor, the updated catalog file copy and updated index portion copies for use in identifying data locations in the LSM tree file system based on received read data instructions.

8. A system for storing data on an object storage platform, the system comprising:
the object storage platform;
a file system installed on the object storage platform, the file system configured as a log-structured merge (LSM) tree data structure;
a processor;
a non-transitory computer readable medium having stored thereon program code for accessing data on the object storage platform, the program code causing the processor to:
access the LSM tree file system on the object storage platform, the LSM tree file system including a plurality of sorted data tables, each sorted data table including a payload portion configured for storing sorted key-value data tuples and an index portion for storing keys of the key-value data tuples mapped to locations of associated key-value data tuples in the payload portion, the LSM tree file system further including a catalog file configured for storing table identifiers mapped to key ranges of the plurality of sorted data tables;
based on receiving a write instruction associated with a first data set, write the first data set to the LSM tree file system in at least one new sorted data table and update the catalog file to include a table identifier of the at least one new sorted data table mapped to a key range of the at least one new sorted data table; and
based on receiving a read data instruction associated with a second data set, identify a data location associated with the second data set based on a table identifier mapped to key ranges of the second data set in the catalog file and on index portions of the sorted data table with which the table identifier is associated and read the second data set from a sorted data table associated with the identified data location.

9. The system of claim 8, wherein, for each sorted data table, the index portion is stored on a first object of the object storage platform and the payload portion is stored as a second object of the object storage platform.

10. The system of claim 8, wherein the object storage platform is installed on at least one server device connected to a network;
the system further comprises at least one client device connected to the network; and
wherein the client device is configured to at least one of read data from and write data to the object storage platform using the file system via the network.

11. The system of claim 10, wherein the at least one client device is configured to store index portion copies of the index portions of the plurality of sorted data tables and a catalog file copy of the catalog file.

12. The system of claim 11, wherein reading data, by the at least one client device, from the object storage platform using the file system includes:
identifying a data location associated with the data to be read in the file system based on the stored index portion copies and the catalog file copy; and
requesting the data to be read from the server device via the network based on the identified data location.

13. The system of claim 10, wherein writing the first data set to the LSM tree file system includes:
buffering the first data set in a write data cache on the client device; and
based on at least one of a cached capacity threshold being exceeded and a cache time interval expiring, sending the data in the write data cache to the server device via the network.

14. The system of claim 11, wherein the LSM tree file system is compacted on the server device based on writing the first data set to the LSM tree file system, and wherein the program code further causes the processor to:
- receive, by the client device from the server device, an updated catalog file copy and updated index portion copies of the LSM tree file system, wherein the updated catalog file copy and updated index portion copies are configured to reflect a structure of the LSM tree file system after being compacted; and
- store, by the client device, the updated catalog file copy and updated index portion copies for use in identifying data locations in the LSM tree file system based on received read data instructions.

15. A non-transitory computer readable storage medium having stored thereon program code executable by a first computer system at a first site, the program code embodying a method for accessing data on an object storage platform, the method comprising:
- accessing a log-structure merge (LSM) tree file system on the object storage platform, the LSM tree file system including a plurality of sorted data tables, each sorted data table including a payload portion configured for storing sorted key-value data tuples and an index portion for storing keys of the key-value data tuples mapped to locations of associated key-value data tuples in the payload portion, the LSM tree file system further including a catalog file configured for storing table identifiers mapped to key ranges of the plurality of sorted data tables;
- based on receiving a write instruction associated with a first data set, writing the first data set to the LSM tree file system in at least one new sorted data table and updating the catalog file to include a table identifier of the at least one new sorted data table mapped to a key range of the at least one new sorted data table; and
- based on receiving a read data instruction associated with a second data set, identifying a data location associated with the second data set based on a table identifier mapped to key ranges of the second data set in the catalog file and on index portions of the sorted data table with which the table identifier is associated and reading the second data set from a sorted data table associated with the identified data location.

16. The non-transitory computer readable storage medium of claim 15, wherein, for each sorted data table, the index portion is stored on a first object of the object storage platform and the payload portion is stored as a second object of the object storage platform.

17. The non-transitory computer readable storage medium of claim 15, wherein the object storage platform is installed on at least one server device connected to a network;
- a processor is installed on a client device connected to the network; and
- wherein the processor of the client device is configured to at least one of read data from and write data to the object storage platform using the LSM tree file system via the network.

18. The non-transitory computer readable storage medium of claim 17, wherein the method embodied by the program code further comprises:
- locally storing index portion copies of the index portions of the plurality of sorted data tables and a catalog file copy of the catalog file.

19. The non-transitory computer readable storage medium of claim 18, wherein identifying the data location includes identifying the data location associated with the second data set based on the locally stored index portion copies and the catalog file copy; and
- wherein reading the second data set includes requesting the second data set from the server device via the network based on the identified data location.

20. The non-transitory computer readable storage medium of claim 18, wherein the LSM tree file system is compacted on the at least one server device based on writing the first data set to the LSM tree file system, and wherein the method embodied by the program code further comprises:
- receiving, by the client device from the at least one server device, an updated catalog file copy and updated index portion copies of the LSM tree file system, wherein the updated catalog file copy and updated index portion copies are configured to reflect a structure of the LSM tree file system after being compacted; and
- storing, by the client device, the updated catalog file copy and updated index portion copies for use in identifying data locations in the LSM tree file system based on received read data instructions.

* * * * *